United States Patent
Takeda et al.

(10) Patent No.: US 12,127,131 B2
(45) Date of Patent: Oct. 22, 2024

(54) DYNAMIC POWER CONTROL FOR PRIORITY BASED TRAFFIC

(71) Applicant: QUALCOMM Incorporated, San Diego, CA (US)

(72) Inventors: Kazuki Takeda, Tokyo (JP); Seyedkianoush Hosseini, San Diego, CA (US); Peter Gaal, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/165,576

(22) Filed: Feb. 2, 2021

(65) Prior Publication Data

US 2021/0258885 A1    Aug. 19, 2021

Related U.S. Application Data

(60) Provisional application No. 62/976,106, filed on Feb. 13, 2020.

(51) Int. Cl.
*H04W 52/14* (2009.01)
*H04L 5/00* (2006.01)
(Continued)

(52) U.S. Cl.
CPC .......... *H04W 52/146* (2013.01); *H04L 5/001* (2013.01); *H04W 52/367* (2013.01); *H04W 72/21* (2023.01); *H04W 76/15* (2018.02)

(58) Field of Classification Search
CPC ............. H04W 52/146; H04W 52/367; H04W 72/0413; H04W 76/15; H04W 52/281;
(Continued)

(56) References Cited

U.S. PATENT DOCUMENTS 9,398,546 B2    7/2016 Kanamarlapudi
9,615,336 B2    4/2017 Vajapeyam et al.
(Continued)

FOREIGN PATENT DOCUMENTS

WO    2014190334 A1    11/2014
WO    2016099935 A1    6/2016

OTHER PUBLICATIONS

Apple Inc: "Feature Lead Summary #4 for Uplink Power Control for NR-NR DC", 3GPP Draft; 3GPP TSG-RAN WG1 #99, R1-1913573, 3rd Generation Partnership Project (3GPP), Mobile Competence Centre; 650, Route Des Lucioles; F-06921, Sophia-Antipolis Cedex; France, vol. RAN WG1, No. Reno, USA; Nov. 11, 2019-Nov. 22, 2019, Nov. 25, 2019 (Nov. 25, 2019), XP051830850, pp. 1-14, Retrieved from the Internet: URL: https://ftp.3gpp.org/tsg_ran/WG1_RL1/TSGR1_99/Docs/R1-1913573.zip R1-1913573.docx [retrieved on Nov. 25, 2019] p. 4, p. 7, line 4—p. 8, last paragraph.
(Continued)

*Primary Examiner* — Steven Hieu D Nguyen
(74) *Attorney, Agent, or Firm* — Paul M. McAdams; Harrity & Harrity, LLP

(57) ABSTRACT

Various aspects of the present disclosure generally relate to wireless communication. In some aspects, a user equipment (UE) may determine a deadline prior to a first uplink transmission associated with a secondary cell group (SCG), wherein the first uplink transmission is associated with a first priority level; determine whether to perform a second uplink transmission associated with a master cell group (MCG), wherein the second uplink transmission is initiated after the deadline, and wherein the second uplink transmission is associated with a second priority level; and adjust a transmit power of the first uplink transmission based at least in part on at least one of: determining whether to perform the
(Continued)

second uplink transmission, or the first priority level and the second priority level. Numerous other aspects are provided.

6 Claims, 7 Drawing Sheets

(51) Int. Cl.
*H04W 52/36* (2009.01)
*H04W 72/21* (2023.01)
*H04W 76/15* (2018.01)

(58) Field of Classification Search
CPC ..... H04L 5/001; H04L 5/0064; H04L 5/0044; H04L 5/0035
See application file for complete search history.

(56) References Cited

U.S. PATENT DOCUMENTS

| | | |
|---|---|---|
| 2016/0014701 A1 | 1/2016 | Nam et al. |
| 2019/0313348 A1 | 10/2019 | Molavianjazi et al. |
| 2020/0053657 A1* | 2/2020 | MolavianJazi ....... H04L 5/0048 |
| 2020/0053724 A1* | 2/2020 | MolavianJazi ....... H04L 5/0048 |
| 2021/0022087 A1* | 1/2021 | Saber .................... H04W 72/56 |
| 2021/0022132 A1* | 1/2021 | Park .................. H04W 72/0473 |
| 2022/0104149 A1* | 3/2022 | Takeda ................ H04W 52/146 |
| 2022/0191802 A1* | 6/2022 | Koorapaty .......... H04W 52/146 |
| 2022/0224466 A1* | 7/2022 | Ji .......................... H04L 5/0035 |
| 2023/0008664 A1* | 1/2023 | Matsumura ........... H04L 1/1671 |

OTHER PUBLICATIONS

Intel Corporation: "Uplink Power Control for NR-NR Dual Connectivity", 3GPP Draft; 3GPP TSG-RAN WG1 #98, R1-1908664, PC_MR-DC, 3rd Generation Partnership Project (3GPP), Mobile Competence Centre; 650, Route Des Lucioles; F-06921 Sophia-Antipolis Cedex; France, vol. RAN WG1, No. Prague, CZ; Aug. 26, 2019-Aug. 30, 2019, Aug. 17, 2019 (Aug. 17, 2019), XP051765272, pp. 1-8, Retrieved from the Internet: URL: http://www.3gpp.org/ftp/tsg_ran/WG1_RL1/TSGR1_98/Docs/R1-1908664.zip [retrieved on Aug. 17, 2019] Sections 2.2 and 2.3; p. 2-p. 3, p. 6-p. 8.
International Search Report and Written Opinion—PCT/US2021/016421—ISA/EPO—dated May 12, 2021.
Apple Inc: "Feature Lead Summary #4 for Uplink Power Control for NR-NR DC", 3GPP TSG-RAN WG1 #99, R1-1913573, Reno, USA, Nov. 18-22, 2019, pp. 1-14, Sections 2-3.

* cited by examiner

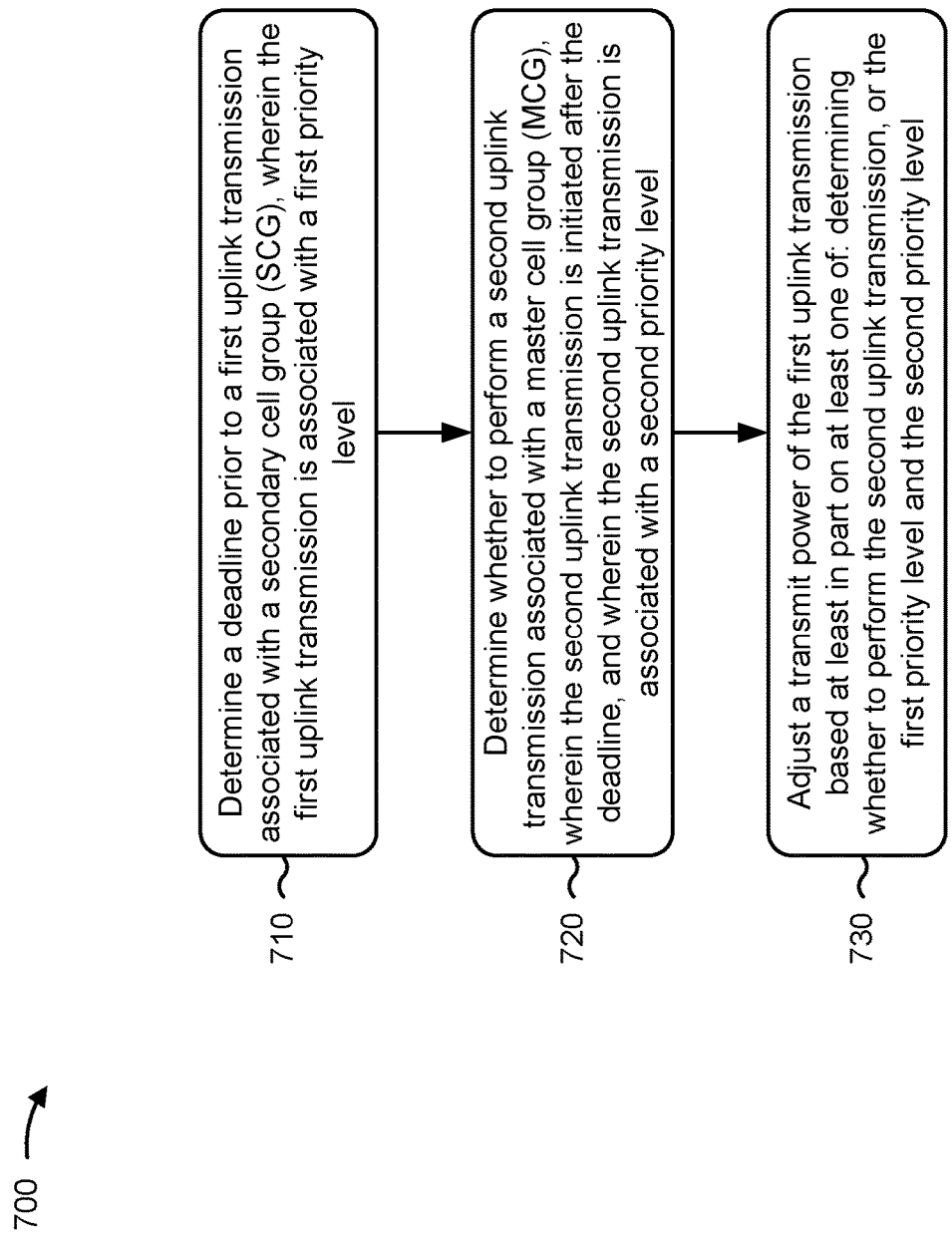

DYNAMIC POWER CONTROL FOR PRIORITY BASED TRAFFIC

CROSS-REFERENCE TO RELATED APPLICATION

This Patent application claims priority to U.S. Provisional Patent Application No. 62/976,106, filed on Feb. 13, 2020, entitled "DYNAMIC POWER CONTROL FOR PRIORITY BASED TRAFFIC," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for dynamic power control for priority based traffic.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment (UE), may include determining a deadline prior to a first uplink transmission associated with a secondary cell group (SCG), wherein the first uplink transmission is associated with a first priority level; determining whether to perform a second uplink transmission associated with a master cell group (MCG), wherein the second uplink transmission is initiated after the deadline, and wherein the second uplink transmission is associated with a second priority level; and adjusting a transmit power of the first uplink transmission based at least in part on at least one of: determining whether to perform the second uplink transmission, or the first priority level and the second priority level.

In some aspects, a UE for wireless communication may include a memory and one or more processors operatively coupled to the memory. The memory and the one or more processors may be configured to determine a deadline prior to a first uplink transmission associated with an SCG, wherein the first uplink transmission is associated with a first priority level; determine whether to perform a second uplink transmission associated with an MCG, wherein the second uplink transmission is initiated after the deadline, and wherein the second uplink transmission is associated with a second priority level; and adjust a transmit power of the first uplink transmission based at least in part on at least one of: determine whether to perform the second uplink transmission, or the first priority level and the second priority level.

In some aspects, a non-transitory computer-readable medium may store one or more instructions for wireless communication. The one or more instructions, when executed by one or more processors of a UE, may cause the one or more processors to determine a deadline prior to a first uplink transmission associated with an SCG, wherein the first uplink transmission is associated with a first priority level; determine whether to perform a second uplink transmission associated with an MCG, wherein the second uplink transmission is initiated after the deadline, and wherein the second uplink transmission is associated with a second priority level; and adjust a transmit power of the first uplink transmission based at least in part on at least one of: determine whether to perform the second uplink transmission, or the first priority level and the second priority level.

In some aspects, an apparatus for wireless communication may include means for determining a deadline prior to a first uplink transmission associated with an SCG, wherein the first uplink transmission is associated with a first priority level; means for determining whether to perform a second uplink transmission associated with an MCG, wherein the second uplink transmission is initiated after the deadline, and wherein the second uplink transmission is associated with a second priority level; and means for adjusting a transmit power of the first uplink transmission based at least in part on at least one of: means for determining whether to perform the second uplink transmission, or the first priority level and the second priority level.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 7 is a diagram illustrating an example process performed, for example, by a user equipment, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
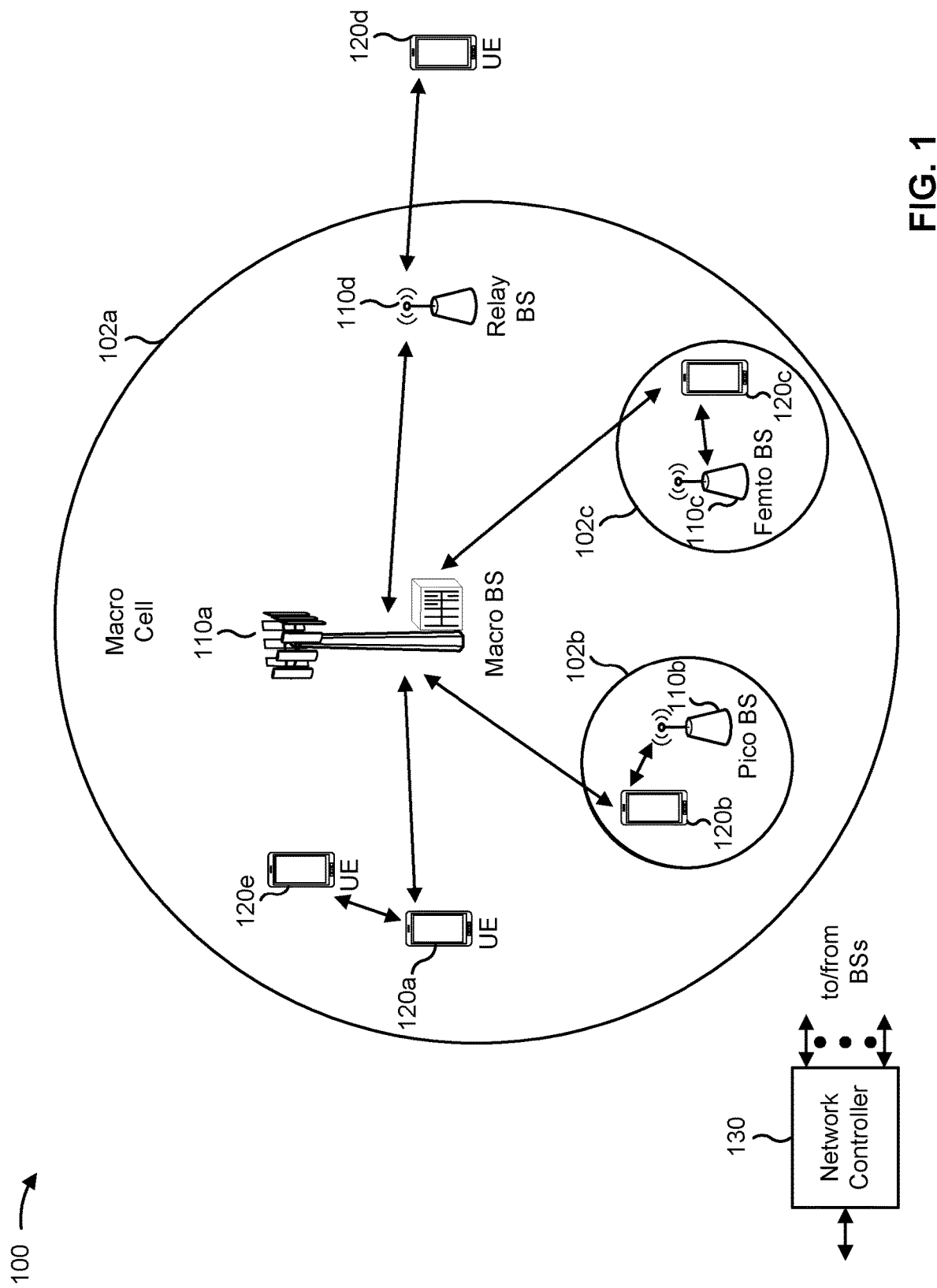
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
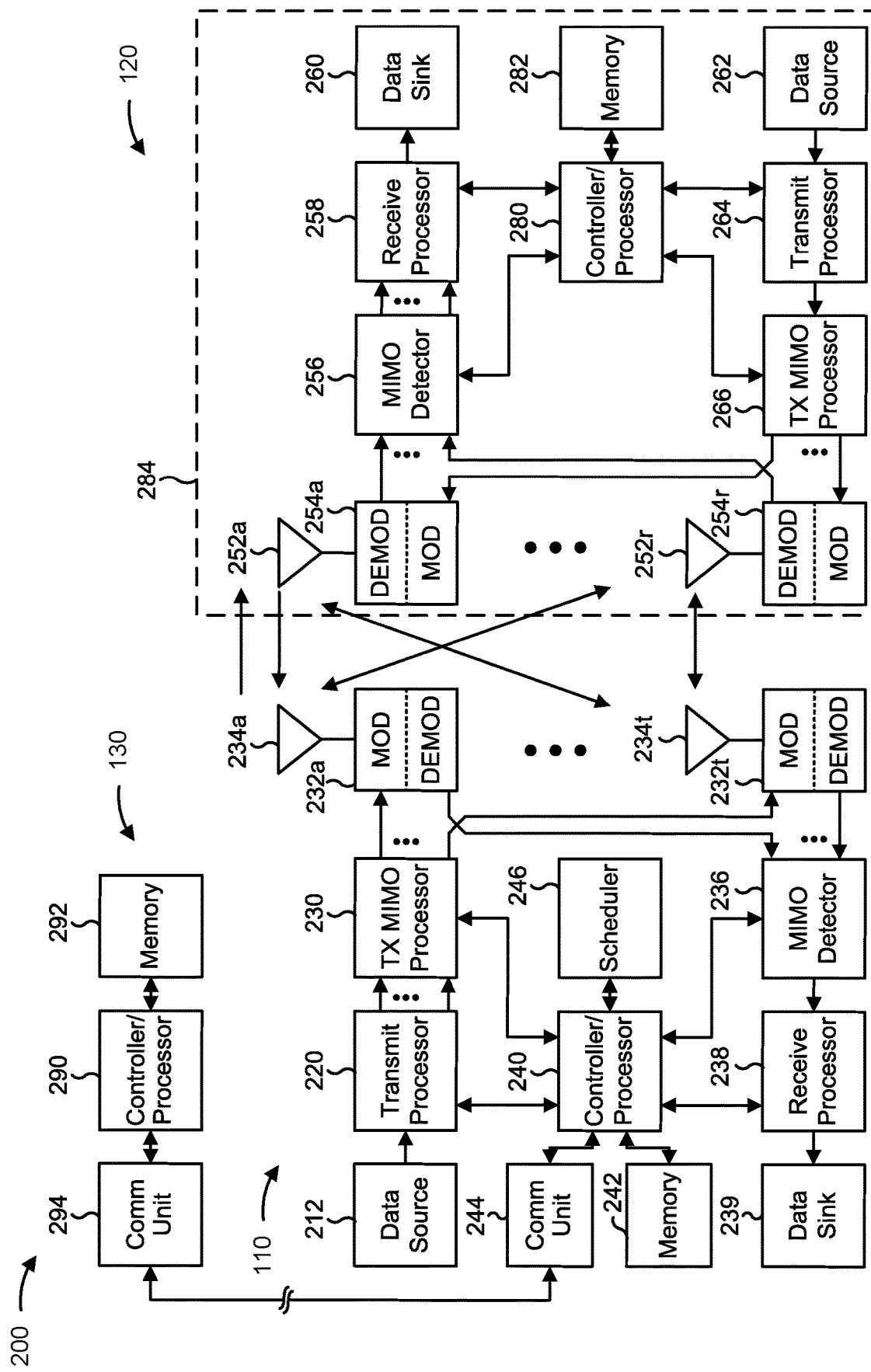
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 3-7.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 3-7.

Controller/processor 240 of base station 110, controller/processor 280 of UE 120, and/or any other component(s) of FIG. 2 may perform one or more techniques associated with dynamic power control for priority based traffic, as described in more detail elsewhere herein. For example, controller/processor 240 of base station 110, controller/processor 280 of UE 120, and/or any other component(s) of FIG. 2 may perform or direct operations of, for example, process 700 of FIG. 7 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7 and/or other processes as described herein. In some aspects, executing instructions may include running the instructions, converting the instructions, compiling the instructions, and/or interpreting the instructions, among other examples.

In some aspects, UE 120 may include means for determining a deadline prior to a first uplink transmission associated with an SCG, wherein the first uplink transmission is associated with a first priority level; means for determining whether to perform a second uplink transmission associated with an MCG, wherein the second uplink transmission is initiated after the deadline, and wherein the second uplink transmission is associated with a second priority level; means for adjusting a transmit power of the first uplink transmission based at least in part on at least one of determining whether to perform the second uplink transmission, or the first priority level and the second priority level; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

In New Radio-Dual Connectivity (NR-DC) power sharing, transmissions to a master cell group (MCG) may be prioritized over transmissions to a secondary cell group (SCG). If transmissions to the MCG and SCG overlap in time, a UE may reduce the transmit power to the SCG. To provide sufficient time to adjust the SCG transmit power, the UE may determine a deadline by which overlapping transmissions must be detected. For example, downlink control information (DCI) (or another suitable physical downlink control channel (PDCCH) message) may schedule an uplink transmission (such as in a physical uplink shared channel (PUSCH)) to an SCG at a time T0. Using an offset time (such as T_offset) the UE may determine a deadline of T0-T_offset. If the UE receives DCI before the deadline that schedules an uplink transmission to the MCG that overlaps in time with a scheduled SCG uplink transmission, the UE may reduce the transmit power of the SCG uplink transmission. If the UE receives a DCI after the deadline that schedules an uplink transmission to the MCG that overlaps in time with a scheduled SCG uplink transmission, the UE may not reduce the SCG uplink transmit power. This is because the specification provided by the relevant communication protocol (such as the 5G/NR protocol) ensures that a UE will not receive, from the network after the deadline, DCI scheduling an MCG uplink transmission that will overlap in time with a scheduled SCG uplink transmission.

In some cases, the UE may determine that an uplink transmission is to be performed on the MCG without having received a DCI for the uplink transmission. For example, an indication of uplink data associated with a semi-static uplink transmission may arrive after the deadline (e.g., T0-T_offset). When a UE is not configured with dynamic power sharing (and thus uses no deadline), if there is a configured grant (CG) PUSCH resource on the MCG, the UE can utilize the CG PUSCH irrespective of when the uplink data arrives from a higher layer. However, when a UE is configured with NR-DC dynamic power sharing, it may be difficult to allocate a dynamic grant PUSCH resource on an MCG overlapping with an SCG PUSCH after the deadline, if the MCG PUSCH is overlapped with the SCG PUSCH at T0. Thus, in this case, a CG PUSCH resource may be used to transmit the uplink data (since a dynamic grant (DG) PUSCH is not available when an indication associated with the uplink data is received after the deadline). The UE may determine whether a semi-static uplink transmission is to be performed based at least in part on the deadline and based at least in part on whether a skip or cancel indication is received before the deadline, which is described in more detail in connection with FIG. 3.

Some communications or resource allocations may be associated with a priority level. For example, 3GPP Release 16 ultra-reliable low latency communication (URLLC) introduces a 1-bit priority indication in DL DCI and UL DCI. If multiple transmissions associated with different priority indexes overlap, then the UE may drop a transmission having a lower priority index. The UE may first resolve overlapped PUSCH or physical uplink control channel (PUCCH) transmissions with the same priority index across UL carriers (e.g., for each UL carrier, the UE may resolve overlapped communications within that carrier). If two overlapped UL transmissions have different priority levels (referred to generally as a high priority and a low priority), then the UE may apply the following rules:

PUCCH with high priority vs PUSCH/PUCCH with low priority: drop the PUSCH/PUCCH with low priority PUSCH with high priority vs PUCCH with low priority: drop the PUCCH with low priority Dynamic grant (DG) PUSCH with high priority vs configured grant (CG) PUSCH with low priority: drop the CG-PUSCH with low priority CG-PUSCH with high priority vs DG-PUSCH with low priority: drop the DG-PUSCH with low priority CG-PUSCH with high priority vs CG-PUSCH with low priority: drop the CG-PUSCH with low priority Thus, the UE may resolve overlapped transmissions associated with different priority levels.

In some aspects, the UE may determine, after the deadline, that a semi-static uplink transmission may be performed. Furthermore, the semi-static uplink transmission may be associated with a priority level. In such a case, there may be ambiguity as to how dynamic power sharing should be handed for the semi-static uplink transmission and an overlapped uplink transmission on an SCG. For example, the transmit power of the overlapped uplink transmission on the SCG may be affected by whether or not the semi-static uplink transmission will be performed, and there may be some uncertainty, after the deadline, regarding whether or not the semi-static uplink transmission will be performed and whether the semi-static uplink transmission is associated with a higher priority level than the overlapped uplink transmission on the SCG. This uncertainty may lead to wasted computing resources and inefficient allocation of MCG and/or SCG resources.

Some techniques and apparatuses described herein provide dynamic power control techniques for priority-based uplink communications based at least in part on respective priority levels of the uplink communications and based at least in part on a deadline for dynamic power control. For example, some techniques and apparatuses described herein selectively modify, or determine not to modify, a transmit power of an uplink transmission on an SCG based at least in part on whether a semi-static uplink transmission is to be performed on an MCG and/or respective priority levels of the semi-static uplink transmission on the MCG and the uplink transmission on the SCG. In this way, the UE may determine a power control configuration for the uplink transmission and the semi-static uplink transmission, which may enable the use of semi-static uplink transmissions in a dynamic power control NR-DC system. Thus, resource utilization and power control on the uplink may be improved and the performance of URLLC transmissions may be improved.

Figure 3:
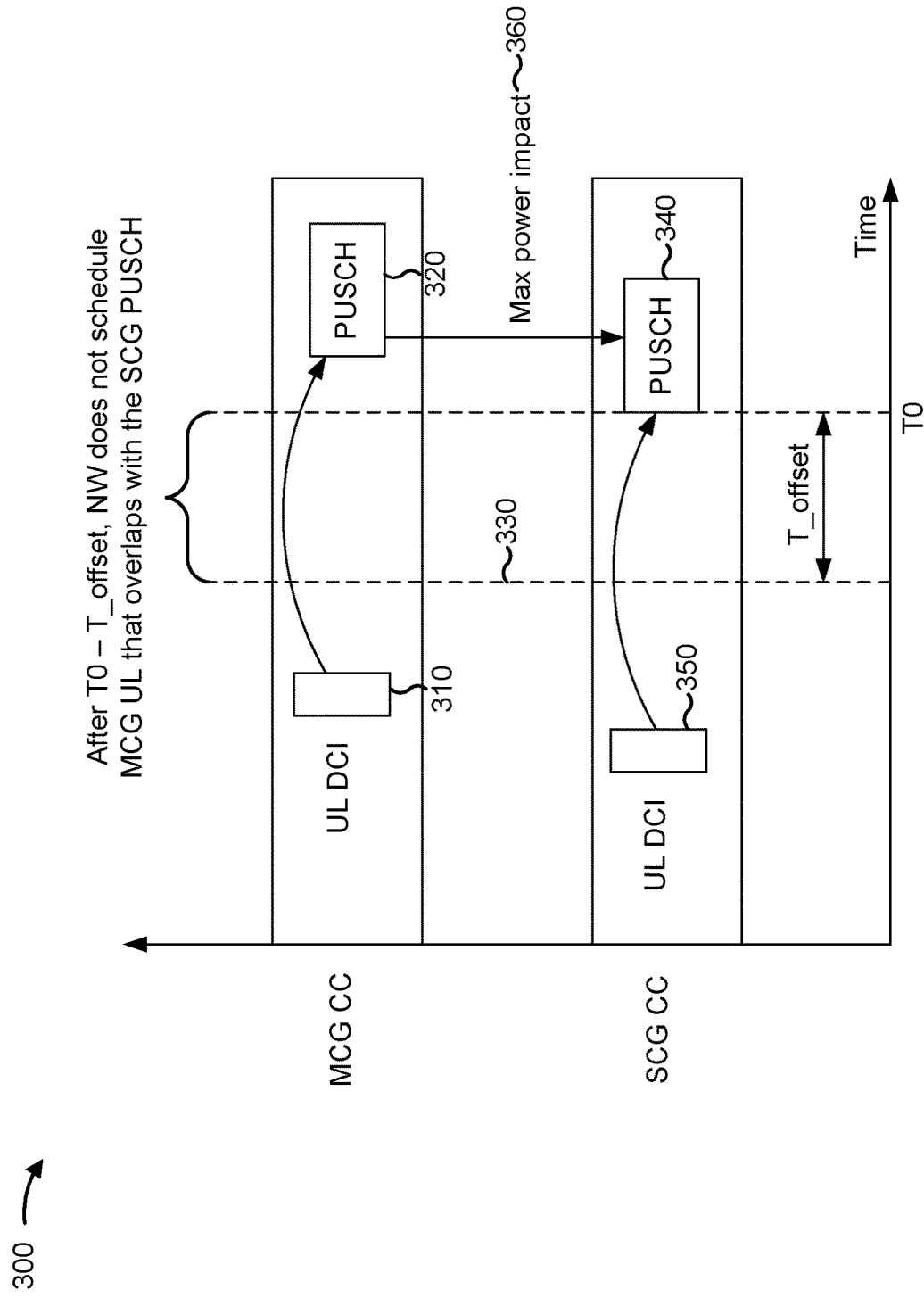
FIG. 3 is a diagram illustrating an example of transmission of a first transmission on a mater cell group (MCG) and a second transmission on a secondary cell group (SCG), in accordance with the present disclosure.

FIG. 3 is a diagram illustrating an example 300 of transmission of a first transmission on an MCG and a second transmission on an SCG, in accordance with the present disclosure. Example 300 shows an MCG component carrier (CC) and an SCG CC. For example, the operations shown in example 300 may be performed by a UE (e.g., UE 120).

As shown, the UE may receive, on the MCG CC, UL DCI 310. For example, the UL DCI 310 may schedule a PUSCH 320 on the MCG CC. In this case, the PUSCH may be referred to as a DG PUSCH. As further shown, the UE may receive the UL DCI 310 before a deadline 330. For example, the deadline 330 may be defined by T0-T_offset, where T0 is a start of a PUSCH 340 (which may correspond to an uplink transmission) and T_offset is an offset time relative to T0. The PUSCH 340 may be scheduled by UL DCI 350. The UE may not expect UL DCI scheduling a PUSCH on the MCG that overlaps with a PUSCH on the SCG after the deadline 330, since, in such a case, the UE may have difficulty performing power management for the MCG and the SCG.

When the UE performs dynamic power sharing for the MCG and the SCG, the MCG's transmit power may impact the SCG's transmit power, as shown by reference number 360. For example, for transmit power determination of the PUSCH 320, the UE may not be required to take into account a transmit power of the SCG. This may be referred to as a 3GPP Release 15 carrier aggregation power allocation procedure within the MCG. For transmit power determination of the PUSCH 340, the UE may take into account an overlapping MCG uplink transmission (e.g., the PUSCH 320) that was scheduled before the deadline 330. For example, the UE may determine the maximum transmit power of the SCG as min{$P_{SCG}$, $P_{total}$–MCG tx power}, wherein $P_{SCG}$ is a baseline transmit power of the PUSCH 340, $P_{total}$ is a maximum UE transmit power, and MCG tx power is a transmit power of the PUSCH 320. For an SCG transmission starting at time T0, the network may not schedule an overlapping MCG uplink transmission after T0-T_offset. Nevertheless, in some circumstances, a transmission on the MCG may be initiated (e.g., uplink data may arrive for transmission on the MCG) after the deadline 330. Techniques and apparatuses described herein provide dynamic power sharing schemes for a situation when the transmission on the MCG is initiated after the deadline 330. In some aspects, the UE may receive a skip or cancel indication that indicates that a configured grant resource will not be used on the uplink. This indication may arrive before the deadline or after the deadline. The UE's handling of such an indication is described in connection with FIG. 4.

In some aspects, the DCI 310 and/or the DCI 350 may indicate a priority level. For example, the DCI 310 may indicate a priority level of the PUSCH 320 and/or the DCI 350 may indicate a priority level of the PUSCH 340. In this case, the UE may first resolve overlapped PUSCH/PUCCH transmissions with a same priority level across carriers using a 3GPP Release 15 approach and may second resolve overlapped PUSCH/PUCCH transmissions associated with different priority levels using the techniques described above. In some aspects, the UE may determine a priority level for a communication that is not associated with DCI. For example, a configured grant transmission may be transmitted on a resource allocation associated with a particular priority level.

As indicated above, FIG. 3 is provided as an example. Other examples may differ from what is described with respect to FIG. 3.

Figure 4:
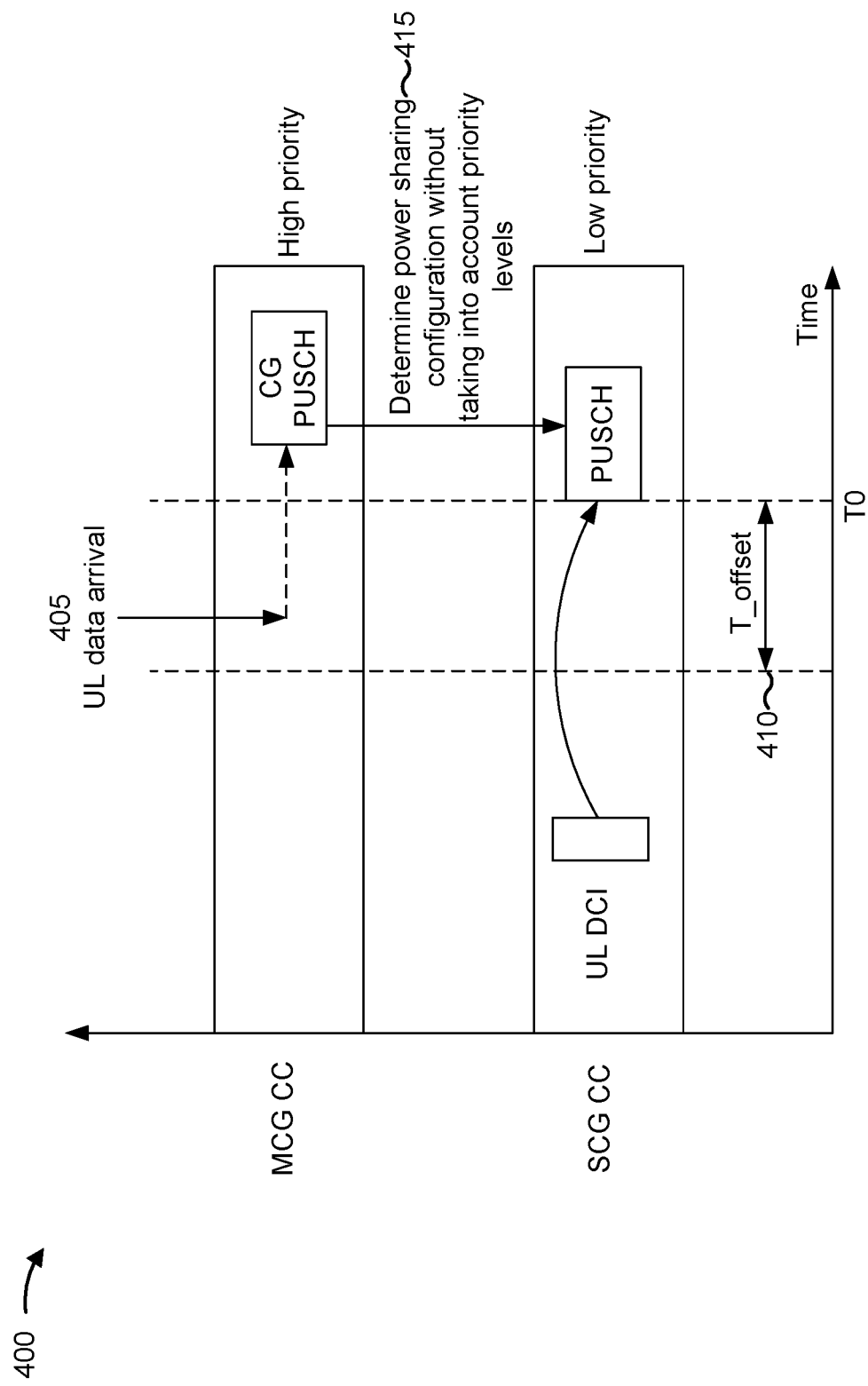
FIGS. 4-6 are diagrams illustrating examples of determination of a power sharing configuration based at least in part on a semi-static uplink transmission that is initiated after a deadline, in accordance with the present disclosure.

FIG. 4 is a diagram illustrating an example 400 of determination of a power sharing configuration based at least in part on a semi-static uplink transmission that is initiated after a deadline, in accordance with the present disclosure. The operations described in example 400 may be performed by a UE (e.g., UE 120 and/or the like) that is configured for NR-DC dynamic power sharing. As shown, example 400 involves an MCG CC and an SCG CC.

As shown in FIG. 4, and by reference number 405, in some aspects, uplink (UL) data may arrive for transmission on the MCG CC after the deadline 410. For example, the UL data may arrive from a higher layer of the UE (e.g., an application layer and/or the like), to a lower layer of the UE, such as a medium access control layer, a physical layer, and/or the like. Since the UE is configured with NR-DC dynamic power sharing, the UE may transmit the UL data on a configured grant PUSCH (shown as CG PUSCH). As further shown, the configured grant PUSCH on the MCG may be associated with a high priority level and the PUSCH on the SCG may be associated with a low priority level (e.g., lower than the high priority level).

If the UE were to receive or generate a skip or cancel indication for the configured grant PUSCH, then the UE may determine that the configured grant PUSCH is not to be used and may not reduce the transmit power on the SCG. For example, in a first approach, if the UE receives or generates a skip or cancel indication for the a semi-static MCG UL transmission before the deadline T0-T_offset, the skip or cancel indication may be taken into account, whereas if the skip or cancel indication does not occur until the deadline T0-T_offset has passed (as shown by reference number 405), then, the UE may assume that the semi-static MCG UL transmission is to be transmitted for dynamic power sharing purposes. In a second approach, the UE may assume that the semi-static MCG UL transmission will be transmitted irrespective of whether or when the skip or cancel indication is received before the deadline. In a third approach, the UE may determine whether to take into account a skip or cancel indication for dynamic power configuration purposes (e.g., may select one of the first or second approaches described above). In a fourth approach, the UE may use one of the above approaches for a primary cell and may use another of the above approaches for a secondary cell.

As shown by reference number 415, the UE may determine a power sharing configuration for the PUSCH on the MCG and the PUSCH on the SCG. In example 400, the UE does not take into account the respective priority levels of the uplink transmission on the MCG and the uplink transmission on the SCG. For examples where the UE takes into account the respective priority levels, refer to FIGS. 5 and 6.

In some aspects, the UE may determine the power sharing configuration on an assumption that the semi-static uplink transmission on the MCG will be transmitted irrespective of whether a skip or cancel indication associated with the semi-static uplink transmission is received. In this case, the UE may decrease the transmit power of the SCG even when a skip or cancel notification is received before the deadline. In some aspects, the UE may determine the power sharing configuration on an assumption that the semi-static uplink transmission on the MCG will be transmitted only if the UE has not received a skip or cancel indication before the deadline. In this case, if the UE receives a skip or cancel indication after the deadline, the UE may nevertheless determine the power sharing configuration on the assumption that the semi-static uplink transmission on the MCG will be transmitted. In some aspects, the UE may select one of the above approaches to use for determining the power sharing configuration. In some aspects, the UE may select an approach based at least in part on whether the MCG is associated with a primary cell or a secondary cell of the UE.

As indicated above, FIG. 4 is provided as an example. Other examples may differ from what is described with respect to FIG. 4.

Figure 5:
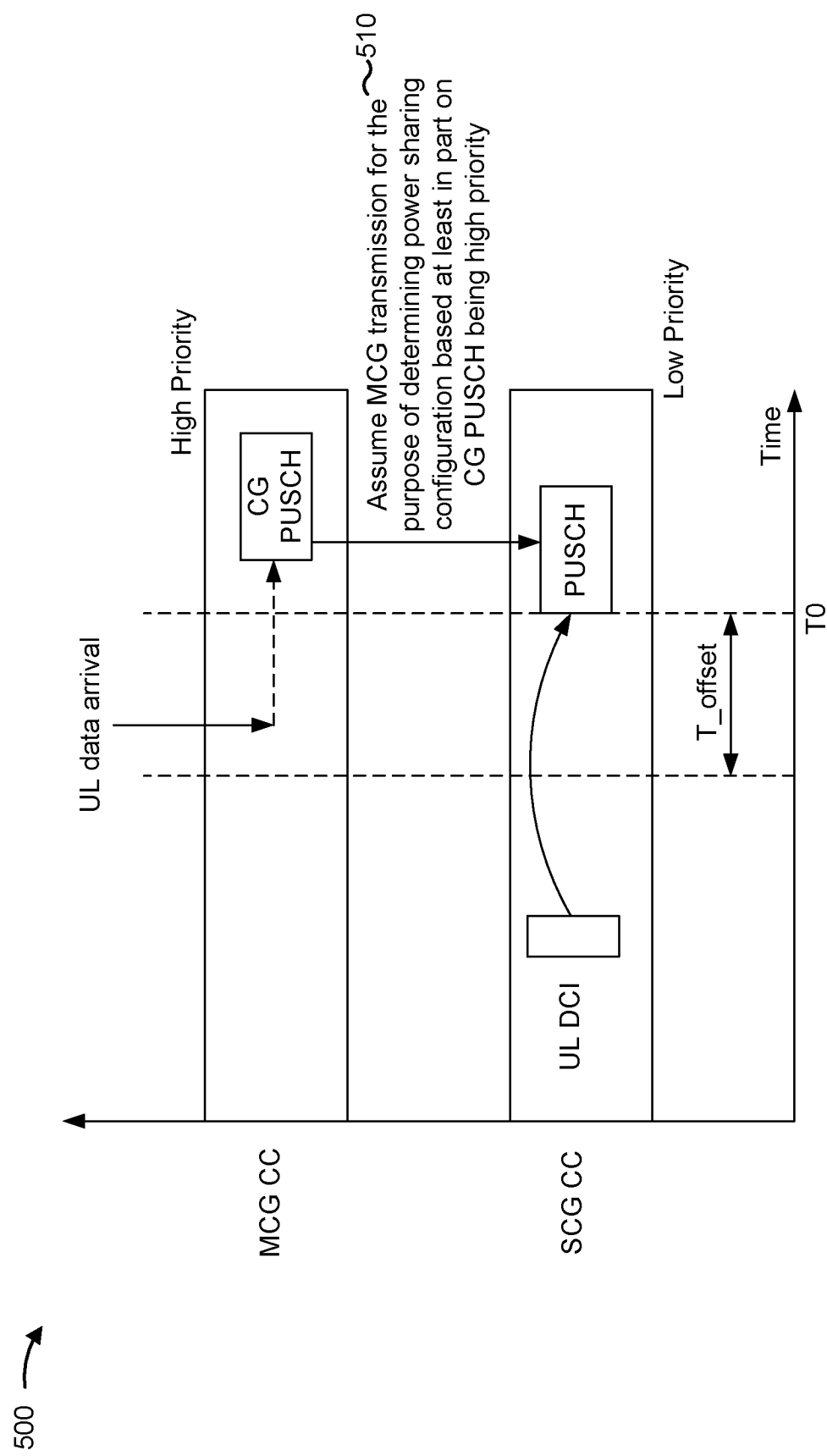

FIG. 5 is a diagram illustrating an example 500 of determination of a power sharing configuration based at least in part on a semi-static uplink transmission that is initiated after a deadline, in accordance with the present disclosure. The operations described in example 500 may be performed by a UE (e.g., UE 120 and/or the like) that is configured for NR-DC dynamic power sharing. As shown, example 500 involves an MCG CC and an SCG CC.

As shown in FIG. 5, UL data may arrive for transmission on the MCG CC after the deadline. As further shown, the UL data may be associated with a high priority level and a transmission on the SCG may be associated with a low priority level. Therefore, as shown by reference number 510, the UE may determine a power sharing configuration for the PUSCH on the MCG and the PUSCH on the SCG on the assumption that the MCG transmission will occur, irrespective of whether or when a skip or cancel indication is received before or after the deadline. For example, the UE may decrease the transmit power of the PUSCH on the SCG if the sum of transmission powers of the PUSCH on the SCG and the PUSCH on the MCG exceed a maximum UE transmit power of the UE, irrespective of whether the skip or cancel indication is received or whether the PUSCH on the MCG has been initiated. In this way, the UE may conservatively determine the power sharing configuration, which may improve performance of the PUSCH on the MCG in the case that the UE is power limited between the PUSCH on the MCG and the PUSCH on the SCG.

As indicated above, FIG. 5 is provided as an example. Other examples may differ from what is described with respect to FIG. 5.

Figure 6:
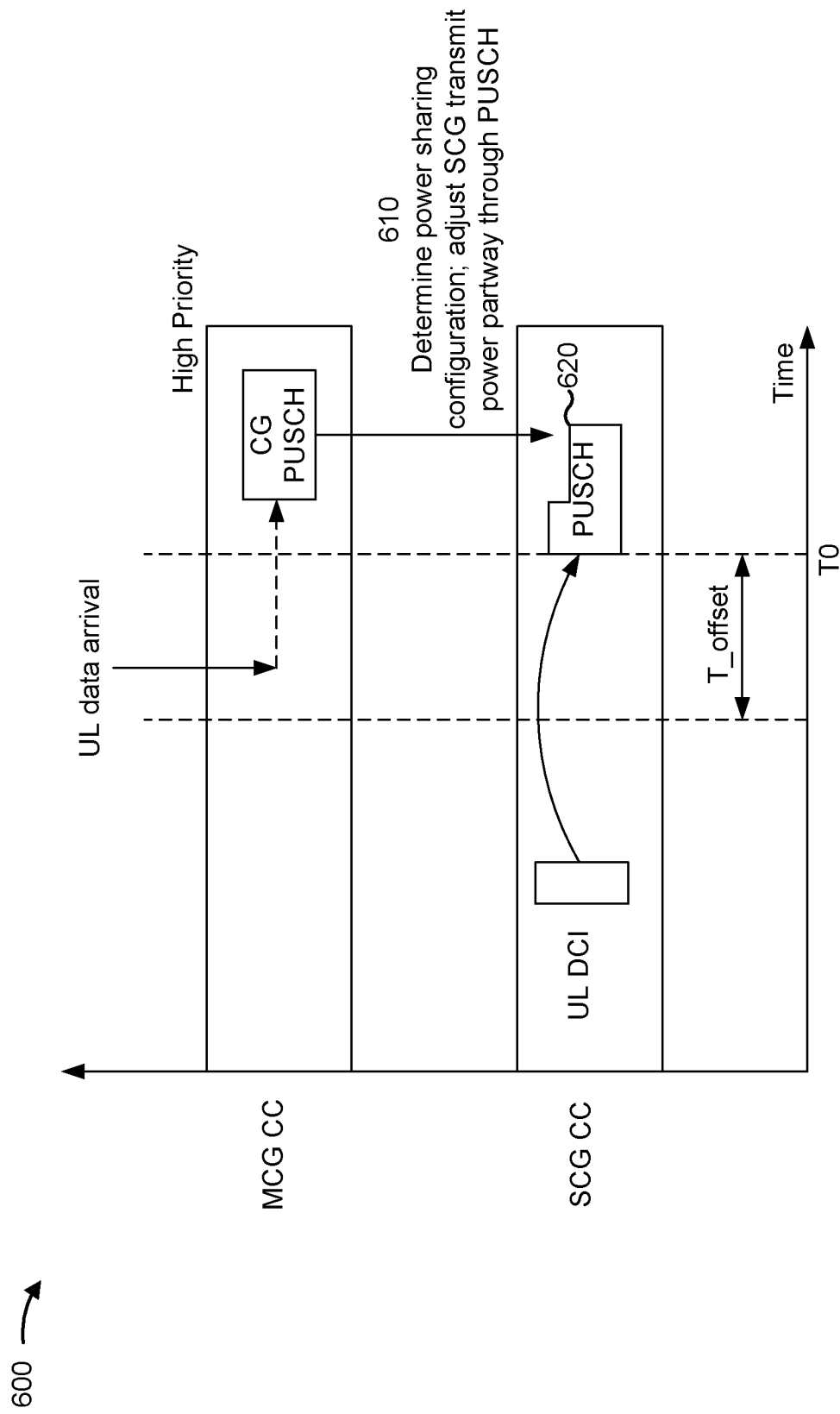

FIG. 6 is a diagram illustrating an example 600 of determination of a power sharing configuration based at least in part on a semi-static uplink transmission that is initiated after a deadline, in accordance with the present disclosure. The operations described in example 600 may be performed by a UE (e.g., UE 120 and/or the like) that is configured for NR-DC dynamic power sharing. As shown, example 600 involves an MCG CC and an SCG CC.

As shown in FIG. 6, UL data may arrive for transmission on the MCG CC after the deadline. As further shown, the UL data may be associated with a high priority level and a transmission on the SCG may be associated with a low priority level. Therefore, as shown by reference number 610, based at least in part on the UL data being associated with the high priority level, the UE may determine a power sharing configuration for the PUSCH on the MCG and the PUSCH on the SCG in which the transmit power of the PUSCH on the SCG is diminished partway through the PUSCH on the SCG. For example, the UE may decrease the transmit power of the PUSCH on the SCG a particular length of time after the UL data arrives for transmission (e.g., T_offset or a different length of time), shown by the notch in the PUSCH on the SCG at reference number 620. In this case, the PUSCH on the SCG may undergo phase discontinuity in some aspects. This approach may enable the UE to use a baseline transmit power for the PUSCH on the SCG until UL data is to be transmitted on the MCG, and then reduce the transmit power on the SCG to accommodate the transmission on the MCG. Thus, transmit power on the SCG is improved when no transmission on the MCG is to be performed. As used herein, "reducing the transmit power" can include reducing the transmit power to any value including zero.

As indicated above, FIG. 6 is provided as an example. Other examples may differ from what is described with respect to FIG. 6.

FIG. 7 is a diagram illustrating an example process 700 performed, for example, by a UE, in accordance with the present disclosure. Example process 700 is an example where the UE (e.g., UE 120 and/or the like) performs operations associated with dynamic power control for priority based traffic.

As shown in FIG. 7, in some aspects, process 700 may include determining a deadline prior to a first uplink transmission associated with an SCG, wherein the first uplink transmission is associated with a first priority level (block 710). For example, the UE (e.g., using controller/processor 280 and/or the like) may determine a deadline prior to a first uplink transmission associated with an SCG, as described above. In some aspects, the first uplink transmission is associated with a first priority level.

As further shown in FIG. 7, in some aspects, process 700 may include determining whether to perform a second uplink transmission associated with an MCG, wherein the second uplink transmission is initiated after the deadline, and wherein the second uplink transmission is associated with a second priority level (block 720). For example, the UE (e.g., using controller/processor 280, transmit processor 264, TX MIMO processor 266, MOD 254, antenna 252, and/or the like) may determine whether to perform a second uplink transmission associated with an MCG, as described above. In some aspects, the second uplink transmission is initiated after the deadline. In some aspects, the second uplink transmission is associated with a second priority level.

As further shown in FIG. 7, in some aspects, process 700 may include adjusting a transmit power of the first uplink transmission based at least in part on at least one of: determining whether to perform the second uplink transmission, or the first priority level and the second priority level (block 730). For example, the UE (e.g., using controller/processor 280, transmit processor 264, TX MIMO processor 266, MOD 254, antenna 252, and/or the like) may adjust a transmit power of the first uplink transmission based at least in part on at least one of, as described above.

Process 700 may include additional aspects, such as any single aspect or any combination of aspects described below and/or in connection with one or more other processes described elsewhere herein.

In a first aspect, adjusting the transmit power of the first uplink transmission is performed irrespective of the first priority level and the second priority level.

In a second aspect, alone or in combination with the first aspect, when the first priority level satisfies a priority threshold, adjusting the transmit power of the first uplink transmission is performed as if the second uplink transmission is to be performed irrespective of whether the second uplink transmission is initiated.

In a third aspect, alone or in combination with one or more of the first and second aspects, based at least in part on the first priority level failing to satisfy a priority threshold, adjusting the transmit power of the first uplink transmission is performed irrespective of the first priority level and the second priority level.

In a fourth aspect, alone or in combination with one or more of the first through third aspects, based at least in part on the first priority level satisfying a priority threshold and the second uplink transmission being initiated after the deadline, adjusting the transmit power of the first uplink transmission comprises reducing the transmit power of the first uplink transmission.

In a fifth aspect, alone or in combination with one or more of the first through fourth aspects, the transmit power of the first uplink transmission is reduced partway through the first uplink transmission.

In a sixth aspect, alone or in combination with one or more of the first through fifth aspects, the first uplink transmission is associated with a phase discontinuity based at least in part on the transmit power of the first uplink transmission being reduced partway through the first uplink transmission.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The following provides an overview of some Aspects of the present disclosure:

Aspect 1: A method of wireless communication performed by a user equipment (UE), comprising: determining a deadline prior to a first uplink transmission associated with a secondary cell group (SCG), wherein the first uplink transmission is associated with a first priority level; determining whether to perform a second uplink transmission associated with a master cell group (MCG), wherein the second uplink transmission is initiated after the deadline, and wherein the second uplink transmission is associated with a second priority level; and adjusting a transmit power of the first uplink transmission based at least in part on at least one of: determining whether to perform the second uplink transmission, or the first priority level and the second priority level.

Aspect 2: The method of Aspect 1, wherein adjusting the transmit power of the first uplink transmission is performed irrespective of the first priority level and the second priority level.

Aspect 3: The method of Aspect 1, wherein, when the first priority level satisfies a priority threshold, adjusting the transmit power of the first uplink transmission is performed as if the second uplink transmission is to be performed irrespective of whether the second uplink transmission is initiated.

Aspect 4: The method of Aspect 1, wherein, based at least in part on the first priority level failing to satisfy a priority threshold, adjusting the transmit power of the first uplink transmission is performed irrespective of the first priority level and the second priority level.

Aspect 5: The method of Aspect 1, wherein, based at least in part on the first priority level satisfying a priority threshold and the second uplink transmission being initiated after the deadline, adjusting the transmit power of the first uplink transmission comprises reducing the transmit power of the first uplink transmission.

Aspect 6: The method of Aspect 5, wherein the transmit power of the first uplink transmission is reduced partway through the first uplink transmission.

Aspect 7: The method of Aspect 6, wherein the first uplink transmission is associated with a phase discontinuity based at least in part on the transmit power of the first uplink transmission being reduced partway through the first uplink transmission.

Aspect 8: An apparatus for wireless communication at a device, comprising a processor; memory coupled with the processor; and instructions stored in the memory and executable by the processor to cause the apparatus to perform the method of one or more Aspects of Aspects 1-7.

Aspect 9: A device for wireless communication, comprising a memory and one or more processors coupled to the memory, the memory and the one or more processors configured to perform the method of one or more Aspects of Aspects 1-7.

Aspect 10: An apparatus for wireless communication, comprising at least one means for performing the method of one or more Aspects of Aspects 1-7.

Aspect 11: A non-transitory computer-readable medium storing code for wireless communication, the code comprising instructions executable by a processor to perform the method of one or more Aspects of Aspects 1-7.

Aspect 12: A non-transitory computer-readable medium storing a set of instructions for wireless communication, the set of instructions comprising one or more instructions that, when executed by one or more processors of a device, cause the device to perform the method of one or more Aspects of Aspects 1-7.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors coupled to the memory, wherein the one or more processors are configured to:
      obtain uplink data for transmission on a component carrier associated with a master cell group (MCG), wherein the uplink data is obtained after a deadline associated with a time offset;
      transmit the uplink data in a non-downlink control information (DCI)-scheduled physical uplink shared channel (PUSCH) transmission associated with the MCG, wherein the non-DCI-scheduled PUSCH transmission is associated with a first priority level; and
      adjust a transmit power of a DCI-scheduled PUSCH transmission irrespective of the first priority level associated with the non-DCI-scheduled PUSCH transmission and a second priority level associated with the DCI-scheduled PUSCH transmission, wherein:
         the DCI-scheduled PUSCH transmission is associated with a secondary cell group (SCG),
         the non-DCI-scheduled PUSCH transmission overlaps in time with the DCI-scheduled PUSCH transmission,
         the transmit power is adjusted according to a power sharing configuration that is based at least in part on the uplink data being obtained after the deadline,
         the adjustment comprises a reduction of the transmit power of the DCI-scheduled PUSCH transmission partway through the DCI-scheduled PUSCH transmission, and
         the DCI-scheduled PUSCH transmission is associated with a phase discontinuity based at least in part on the transmit power of the DCI-scheduled PUSCH transmission being reduced partway through the DCI-scheduled PUSCH transmission.

2. The UE of claim 1, wherein, to adjust the transmit power of the DCI-scheduled PUSCH transmission irrespective of the first priority level associated with the non-DCI-scheduled PUSCH transmission and the second priority level associated with the DCI-scheduled PUSCH transmission, the one or more processors are configured to adjust, based at least in part on the second priority level failing to satisfy a priority threshold, the transmit power of the DCI-scheduled PUSCH irrespective of the first priority level associated with the non-DCI-scheduled PUSCH transmission and the second priority level associated with the DCI-scheduled PUSCH transmission.

3. The UE of claim 1, wherein the non-DCI-scheduled PUSCH transmission is a configured grant (CG) PUSCH transmission and the DCI-scheduled PUSCH transmission is a dynamic grant (DG) PUSCH transmission.

4. A user equipment (UE) for wireless communication, comprising:
   a memory; and
   one or more processors coupled to the memory, wherein the one or more processors are configured to:
      determine a deadline prior to a first uplink transmission associated with a secondary cell group (SCG), wherein the first uplink transmission is associated with a first priority level that satisfies a priority threshold;
      determine whether to perform a second uplink transmission associated with a master cell group (MCG), wherein the second uplink transmission is initiated after the deadline, and wherein the second uplink transmission is associated with a second priority level; and
      adjust a transmit power of the first uplink transmission as if the second uplink transmission is to be performed irrespective of whether the second uplink transmission is initiated, wherein:
         the adjustment comprises a reduction of the transmit power of the first uplink transmission partway through the first uplink transmission,
         the first uplink transmission is associated with a phase discontinuity based at least in part on the reduction of the transmit power of the first uplink transmission partway through the first uplink transmission, and
         the adjustment is based at least in part on at least one of:
            the determination whether to perform the second uplink transmission, or
            the first priority level and the second priority level.

5. A user equipment (UE) for wireless communication, comprising:
   a memory; and
   one or more processors coupled to the memory, wherein the one or more processors are configured to:
      determine a deadline prior to a first uplink transmission associated with a secondary cell group (SCG), wherein the first uplink transmission is associated with a first priority level that fails to satisfy a priority threshold;
      determine whether to perform a second uplink transmission associated with a master cell group (MCG), wherein the second uplink transmission is initiated after the deadline, and wherein the second uplink transmission is associated with a second priority level; and adjust a transmit power of the first uplink transmission irrespective of the first priority level and the second priority level, the adjustment based at least in part on the determination whether to perform the second uplink transmission, wherein:
- the adjustment comprises a reduction of the transmit power of the first uplink transmission partway through the first uplink transmission, and
- the first uplink transmission is associated with a phase discontinuity based at least in part on the transmit power of the first uplink transmission being reduced partway through the first uplink transmission.

6. A user equipment (UE) for wireless communication, comprising:

a memory; and one or more processors coupled to the memory, wherein the one or more processors are configured to:
- determine a deadline prior to a first uplink transmission associated with a secondary cell group (SCG), wherein the first uplink transmission is associated with a first priority level that satisfies a priority threshold;
- determine whether to perform a second uplink transmission associated with a master cell group (MCG), wherein the second uplink transmission is initiated after the deadline, and wherein the second uplink transmission is associated with a second priority level; and
- adjust a transmit power of the first uplink transmission based at least in part on at least one of:
  - the determination whether to perform the second uplink transmission, or
  - the first priority level and the second priority level,
- wherein the adjustment comprises a reduction of the transmit power of the first uplink transmission partway through the first uplink transmission based at least in part on the first priority level satisfying the priority threshold and the second uplink transmission being initiated after the deadline, and
- wherein the first uplink transmission is associated with a phase discontinuity based at least in part on the transmit power of the first uplink transmission being reduced partway through the first uplink transmission.

* * * * *